Lefranc & Magoun.
Brake for Treating Fibrous Plants.
N° 106,700. Patented Aug. 23, 1870.
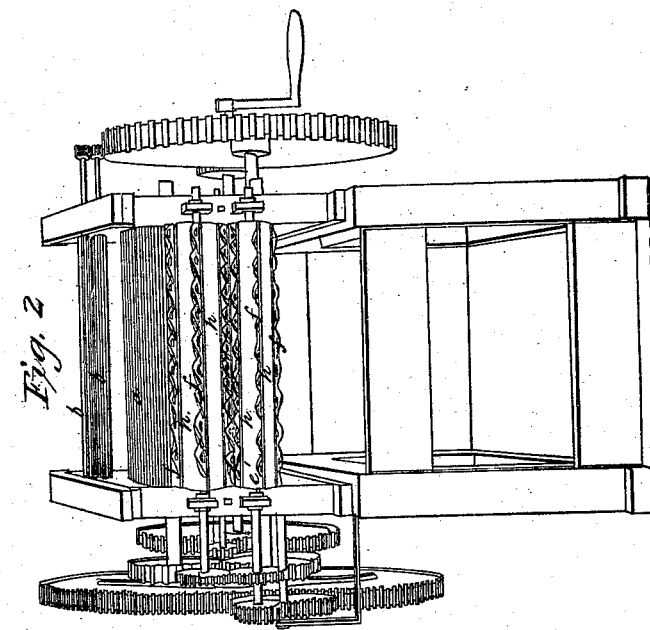
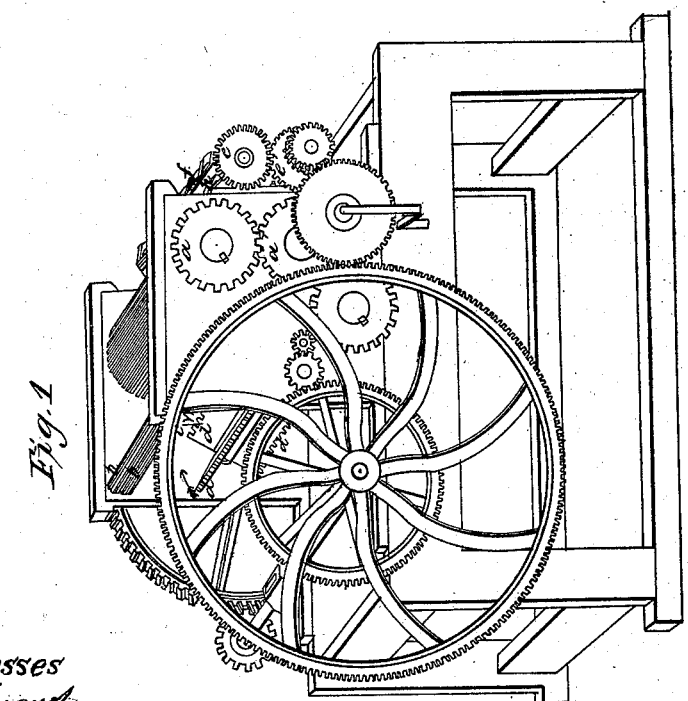

UNITED STATES PATENT OFFICE.

EMILE LEFRANC AND JOSEPH NAGOUA, OF NEW ORLEANS, LA.

IMPROVED MACHINE FOR TREATING RAMIE AND OTHER TEXTILE PLANTS.

Specification forming part of Letters Patent No. 106,700, dated August 23, 1870.

*To all whom it may concern:*

Be it known that we, EMILE LEFRANC and JOSEPH NAGOUA, both of the city of New Orleans, in the State of Louisiana, have invented an Improved Decorticating-Machine, to be used in securing the Textile Portions of Ramie and other Textile Plants; and we do hereby declare that the following is a full and exact description thereof, reference being had to the accompanying drawings, making part of this specification.

Our invention relates to means for harvesting or securing from ramie, and other like textile plants, their fibrous coating; and consists in a novel construction and arrangement of devices intended to serve as an efficient apparatus for the purpose named.

In the drawings, Figure 1 is a perspective longitudinal, and Fig. 2 an end view of the machine.

$a\ a'$ and $b\ b'$ are crushing and feeding rollers, having their peripheries grooved correspondingly, as shown. $c$ is a toothed support for the plant while moving into the rollers $a\ a'$; and $d$, revolving beaters. $e\ e'$ are cylinders, furnished with a series of knives, $f$, which said knives may be either spiral, curved, or elliptical in form, cushioned by a rubber or other elastic surface, $h$, adapted, as shown, to the periphery of the cylinders $e\ e'$. The motive power is applied to the axis $g$.

The operation of our machine is as follows: The ramie, or other plant, is first fed between the rollers $b\ b'$, from whence it passes between the rollers $a\ a'$, and thence between the knives $f$ of the cylinders $e\ e'$. The speed of the surface of the rollers $a\ a'$ is a little slower than that of the rollers $b\ b'$, better to avoid the tension of the plant, which might break the fibers; but the speed of the cylinders $e\ e'$ is much higher than that of the rollers $a\ a'$, in order that, when the plant is crushed, the knives $f$ should strip off the bark and the pith of the stalk, leaving only the fibers in a ribbon-like state, while rollers $a\ a'$, revolving comparatively slow, hold firmly the same, and deliver between the knives $f$, as gradually as the necessity may show.

It is obvious that there would be left uncleaned one end of the plant, equal in length to the distance between the centers of the rollers $a\ a'$ and cylinders $e\ e'$, because as soon as the rear end of the plant is past the crushers $a\ a'$ the cylinders $e\ e'$, instead of stripping the plant, would simply roll it out. To avoid this we employ revolving toothed beaters $d$, and a toothed support, $c$.

The operation then is as follows: The plant is crushed, first, by the rollers $b\ b'$, and, secondly, by the rollers $a\ a'$, and while the forward end of the plant reaches the latter, the rear end of the plant, when past the former, falls on and between the arms of the beaters $d$, which, revolving at a high velocity in the direction of the arrow shown in the drawing, bend and divide the plant over the toothed support $c$, and, jointly with it, strips the bark and the pith off that end of the plant before it reaches the crushers $a\ a'$, so that the plant, after passing through the machine, is perfectly cleaned from end to end, the fiber alone being left.

The speed of the rollers $a\ a'$ and $b\ b'$ must be regulated relatively to the speed of the cylinders $e\ e'$ and beaters $d$, according to the character of the plant and consequent difficulty of removing bark and pith from the stalk of the same, so that the rollers $a\ a'$ and $b\ b'$ should not feed the plant into the knives and beaters faster than the latter might remove the superfluous vegetable matters, this being the question of the quality and character of the plant, the requisite degree of fineness of the fibers and other conditions. In our drawings only one pair of cylinders, $e\ e'$, and one set of beaters, $d$, with one support, $c$, are shown, but, if necessary, two, three, or more, of any or all of them, may be employed to obtain the aforesaid result. The teeth of the support $c$ and beaters $d$ may be curved or bent in the direction opposite to the direction of motion of the plant. The support $c$ may be made either stationary, adjustable at will, or, by any convenient mechanism, set into reciprocating, horizontal, or other motion.

The object of furnishing the cylinders $e\ e'$ with the elastic cushions $h$ is that the knives $f$, placed thereon, should not cut, but only strip, the plant. These knives may be placed parallelly to the axis of their cylinders, or around in a spiral, or in curves, or zigzag, longitudinally or perpendicularly to the same.

Having thus described our invention, what we claim as new, and desire to secure by Letters Patent, is—

The combination, in the decorticating-machine herein described, of the rollers $a$ $a'$ and $b$ $b'$, cylinders $e$, provided with knives $f$, cushioned, as shown, revolving beaters $d$, and support $c$, when said parts are constructed substantially as described, and arranged to operate as and for the purpose specified.

To the above specification and claims of our invention we hereunto set our hands this 30th day of April, A. D. 1870.

E. LEFRANC.
J. NAGOUA.

Witnesses:
AD. JACQUET,
JEAN PEYREYNE.